April 16, 1968  R. W. NAYLOR  3,378,752
SILICON CONTROLLED RECTIFIER INVERTER
Filed March 30, 1965  3 Sheets-Sheet 1

INVENTOR
ROBERT W. NAYLOR
BY John J. Gaydos
ATTORNEY

April 16, 1968     R. W. NAYLOR     3,378,752
SILICON CONTROLLED RECTIFIER INVERTER
Filed March 30, 1965     3 Sheets-Sheet 3

INVENTOR
ROBERT W. NAYLOR
BY John J. Gaydos
ATTORNEY

United States Patent Office 3,378,752
Patented Apr. 16, 1968

3,378,752
SILICON CONTROLLED RECTIFIER INVERTER
Robert W. Naylor, Weston, Ontario, Canada, assignor to CTS of Canada, Ltd., Streetsville, Ontario, Canada, a corporation of Ontario
Filed Mar. 30, 1965, Ser. No. 443,950
Claims priority, application Canada, Nov. 14, 1964, 915,627
12 Claims. (Cl. 321—18)

ABSTRACT OF THE DISCLOSURE

Improved inverter wherein a pair of parallel connected main silicon controlled rectifiers are capable of being fired 180° out of phase by the application of pulse signals to the gate electrodes thereof. Conduction of the main silicon controlled rectifiers is stopped by the firing of a third silicon controlled rectifier connected in the inverter circuit. When conducting, the third silicon controlled rectifier effectively shorts out the last triggered main silicon controlled rectifier. Feed-back means comprising a sensing circuit monitors the inverter output voltage and shifts the firing angle of the third silicon controlled rectifier to alter the firing cycle of the main silicon controlled rectifiers. In this manner a predetermined output voltage is supplied to a load. Input and output filters are also provided to improve the wave form of the inverter output voltage.

The present invention relates to inverters, and, more particularly, to a silicon controlled rectifier inverter.

Generally, solid state inverter circuits employ a pair of silicon controlled rectifiers connected in parallel and one of the rectifiers is fired 180° out of phase with the other rectifier for producing an alternating wave output voltage. The main difficulty with such silicon controlled rectifier inverter circuits is that once a pulse has been applied to the gate of one of the silicon controlled rectifiers, the rectifier continues to conduct for the remaining half of the cycle, i.e., until the other rectifier starts to conduct. It would, therefore, be desirable to provide a control circuit for stopping conduction of a silicon controlled rectifier during any portion of the cycle.

Various means have been employed for maintaining the voltage constant at the load such as by altering the input voltage to the silicon controlled rectifier circuits or by changing the voltage on the primary of the transformer. Such control, is, however, difficult to maintain especially when it is necessary to control the output voltage of the inverter within a specified value and the load is subject to change. It would, therefore, also be desirable to provide improved means for controlling the output voltage of silicon controlled rectifiers.

Accordingly, it is an object of the present invention to provide improved means for controlling the output voltage of a silicon controlled rectifier.

Another object of the present invention is to provide a control circuit for stopping conduction of a silicon controlled rectifier during the conducting half of the cycle.

An additional object of the present invention is to provide feedback for an inverter circuit for maintaining a fixed voltage at the load.

A further object of the present invention is to provide an inverter circuit employing a pair of silicon controlled rectifiers with a third silicon controlled rectifier for stopping conduction of one of the pair of rectifiers during the conduction half of the cycle.

Further objects and advantages of the present invention will become apparent as the following description proceeds, and the features of novelty characterizing the invention will be pointed out with particularity in the claims annexed to and forming a part of this specification.

Briefly, the present invention is concerned with improved inverter control circuitry. The inverter circuit connected to a source of direct current comprises a pair of main silicon controlled rectifiers connected in parallel and capable of being fired 180° out of phase. The output of the rectifiers is connected to a transformer. A third silicon controlled rectifier is connected in the inverter circuit for halting conduction of the main silicon controlled rectifiers. Conduction of the main rectifiers is obtained by feeding an on pulse signal from a control circuit into the gate of each of the main silicon controlled rectifiers. When it is desired to halt conduction of one of the main rectifiers during any degree of the conduction cycle, an off pulse signal generator synchronized with the on pulse signal fed into the main silicon controlled rectifier feeds an off pulse signal into the gate of the third silicon controlled rectifier causing the third silicon controlled rectifier to short out the main silicon controlled rectifier and stop conduction thereof. A sensing circuit samples the load voltage and, accordingly, shifts the phase angle of the off pulse signal of the off pulse signal generator with respect to the on pulse signal for altering the firing cycle of the main silicon controlled rectifiers. A suitable input filter is connected between the main rectifiers and the source of direct current, and a sine wave filter is connected between the transformer and the load for improving the wave form of the output voltage of the inverter control circuitry.

For a better understanding of the present invention, reference may be had to the accompinying drawings wherein the same reference numerals have been applied to like parts and wherein.

Figure 1:
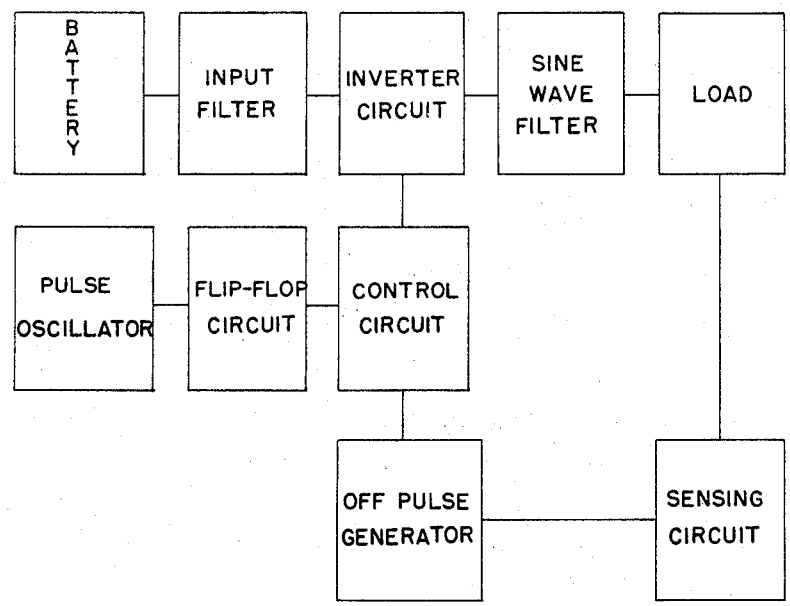
FIGURE 1 is a block diagram of the various circuits employed in the silicon controlled rectifier inverter.
Figure 2:
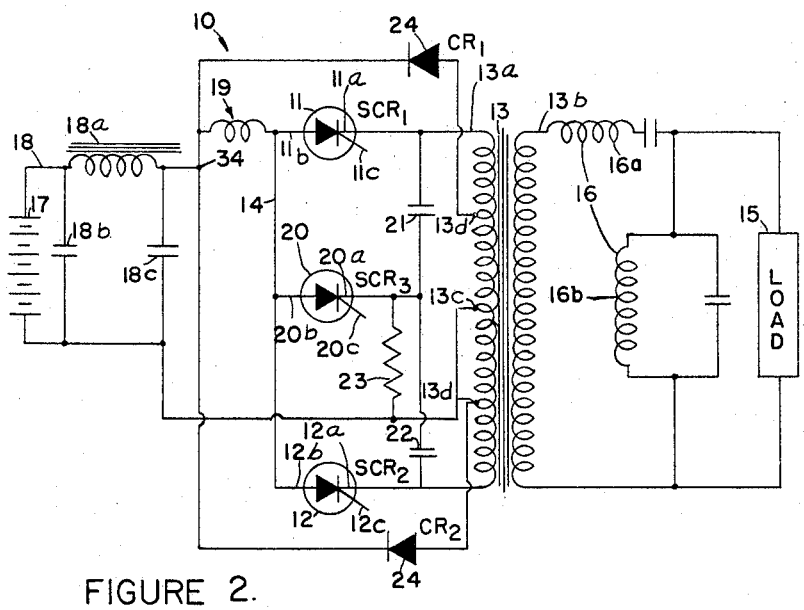
FIGURE 2 is a schematic diagram of the inverter circuit.

Referring now to the drawings and more particularly to FIGURE 2, the inverter circuit 10 comprises a pair of main silicon controlled rectifiers 11 and 12 having their cathode electrodes 11a and 12a respectively connected to the terminals of a primary winding 13a of a transformer 13. The anode electrodes 11b and 12b of the silicon controlled rectifiers 11 and 12 are connected together by a conductor 14. A load 15 is connected across the secondary winding 13b of the transformer 13 and a suitable series parallel sine wave filter 16 is connected between the load 15 and the secondary winding 13b for improving the wave form of the voltge at the load. The sine wave filter 16 comprises a series resonant and a parallel resonant circuit. The resonant circuits are tuned to the frequency of the inverter. One side of a source of direct current, for example, a battery 17, is connected to the anodes through a filter and inductance. A pi type input filter 18 comprising a filter choke 18a and a pair of capacitors 18b and 18c are connected to the battery 17 to reduce noise. The inductance 19 provides a voltage drop during switching. The other side of the battery 17 is connected to a center tap 13c on the primary winding 13a of the transformer 13.

In accord with the present invention, it is possible to halt the firing cycle of either of the main silicon controlled rectifiers once they start to conduct by connecting a third silicon controlled rectifier 20 having a cathode 20a and an anode 20b into the inverter circuit 10. The anode electrode 20b is connected to the anodes 11b and 12b of the main silicon controlled rectifiers 11 and 12 by means of the conductor 14. The cathode electrode 20a is connected to the junction between a pair of capacitors 21 and 22 connecting the cathodes 11a and 11b of the main silicon controlled rectifiers 11 and 12 together. In order to maintain the cathode 20a at zero average potential, a resistor 23 is connected between the center tap 13c of the primary winding of the transformer 13 and the cathode 20a of the third silicon controlled rectifier 20.

Assuming one of the main silicon controlled rectifiers, e.g., rectifier 11, is turned on by applying an on pulse signal to the gate 11c thereof, rectifier 11 will continue to conduct and charge the capacitors 21 and 22 until the rectifier 12 starts to conduct. The main silicon controlled rectifier 11 can, however, be turned off before the end of the conduction cycle by shorting the cathode 11a to the anode 11b, i.e. dropping the voltage across the rectifier 11 to zero. To this end, another pulse signal, hereinafter referred to as an off pulse signal, is fed to the gate 20c of the third silicon controlled rectifier 20. As soon as the third rectifier 20 starts to conduct, the anode voltage of silicon controlled rectifier 11 is reduced to approximately the voltage of the junction of capacitors 21 and 22 which is close to zero potential. This is possible because of the instantaneous voltage drop across inductance 19. As will be understood, switching of the third rectifier 20 to a conductive state rapidly increases the rate of flow of the current through the inductance 19 while rectifier 11 is still conducting. This rapid change in flow of current or sudden surge, giving the effect of a high frequency, causes the impedance of the inductance 19 to increase rapidly to resist the change in rate of flow of current therethrough and the voltage drop across the inductance 19 correspondingly increases. As the impedance of the inductance 19 increases, the current supplied to rectifier 11 becomes less than the minimum holding current required to maintain rectifier 11 in a conducting state, it being understood that the above-mentioned sequence of events takes place during an extremely short period of time. The rectifier 11, therefore, stops conducting. The third silicon controlled rectifier will also stop conducting when the other main silicon controlled rectifier comes on. It may stop conducting because as the capacitor 21 charges up to the battery voltage, the current through the rectifier 20 continues to decrease until it approaches a value causing the rectifier 20 to become nonconductive due to the action of the AC filter inductances. The resistor 23 connected to the cathode 20a of the silicon controlled rectifier 20 maintains the cathode 20a at zero average potential in order that the third silicon controlled rectifier 20 can again be triggered by applying another off pulse signal to the gate 20c thereof.

A pair of diodes 24 are connected into the inverter circuit for limiting the voltage induced in the transformer primary by the sine wave filters to the source voltage, e.g., the battery 17. The cathode electrodes of the diodes 24 are tied together and connected to the source of direct current at junction 34, and the anode electrodes of the diodes 24 are connected to taps 13d on the transformer intermediate the center tap 13c and the end terminals of the primary winding 13a of the transformer 13 as schematically shown in FIGURE 2 of the drawings. By connecting the cathodes of the diodes 24 to the junction 34, the cathode of each of the diodes is maintained at the same voltage as the battery 17. As soon as one of the silicon controlled rectifiers, for example, rectifier 11, becomes nonconductive due to an off pulse signal being applied to the gate of the third silicon controlled rectifier 20, the decaying field in the AC filter series inductance 16a instantaneously induces a voltage to cause a current to continue to flow. When the induced voltage becomes greater than the voltage of the battery 17, the diode becomes conductive. The diodes 24, therefore, provide a low impedance path looking back from the sine wave filter 16 when the silicon controlled rectifiers 11 and 12 are not conducting. Such circuitry improves the sine wave form at inverter output.

Figure 3:
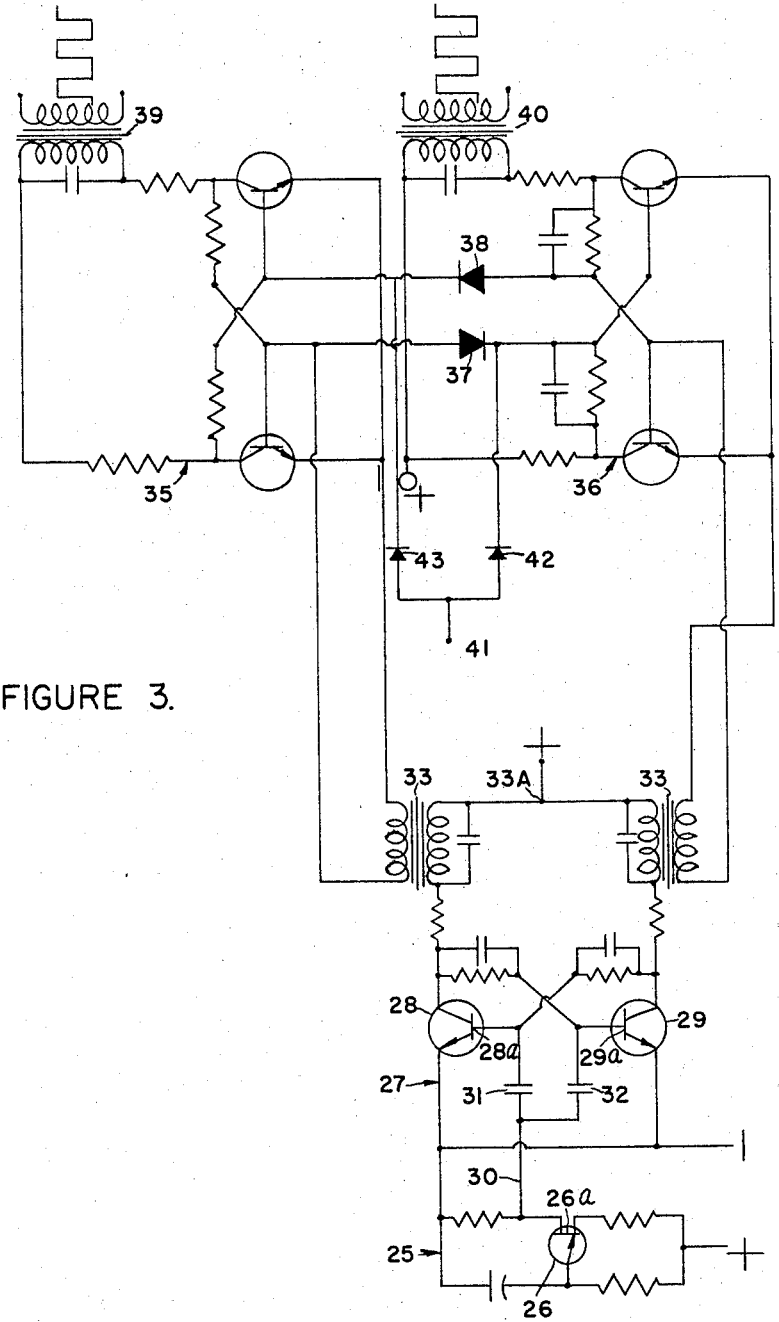
FIGURE 3 is a schematic diagram of the control circuit for the silicon controlled rectifier inverter.

In order to control the 180° out of phase signals to the main gates of the silicon controlled rectifiers 11 and 12, the schematic circuit of FIGURE 3 is employed. A solid state oscillator 25 employing a unijunction transistor 26 is designed to operate at twice the inverter frequency by choosing the proper circuit components. The output pulses emanating from the solid state oscillator 25 are fed into a flip-flop circuit 27 having a pair of transistors 28 and 29. The base electrodes 28a and 29a of the pair of transistors 28 and 29 employed in the transistor flip-flop circuit 27 are connected to the solid state oscillator 25 by a lead 30. The base one electrode 26a of the unijunction transistor 26 is connected to the lead 30. A pair of capacitors 31 and 32 are connected in the base electrode circuit for switching the pulse from the solid state oscillator 25 to the transistors 28 and 29 in alternating sequence. A pair of transformers 33 having one side of their primary windings tied together at junction 33a are connected to the flip-flop circuit. As schematically shown in FIGURE 3 of the drawings, the primary windings of the transformers 33 form the collector loads of the transistors 28 and 29 of the flip-flop circuit 27. Alternatively, a resistor capacitor type coupling could be employed therewith.

The secondary windings of the transformers 33 are connected to a pair of driver flip-flop circuits 35 and 36. A pair of output transformers 39 and 40 are connected in the collector leads of the driver flip-flop circuits 35 and 36, and the secondary windings of the transformers 39 and 40 are connected to the gates of the silicon controlled rectifiers 11 and 12. The transistor base electrodes of the flip-flop circuit 35 are cross-coupled to the transistor base electrodes of the transistor flip-flop circuit 36 by a pair of diodes 37 and 38 thereby assuring that the driver flip-flop circuits 35 and 36 are always opposite with respect to each other. The diodes 37 and 38 negate the possibility that a signal from one of the output transformers 39 and 40 of the driver flip-flop circuits 35 and 36 would not be 180° out of phase causing the signal from the secondary winding of the output transformers 39 and 40 to fire both of the main silicon controlled rectifiers 11 and 12 during the same time. The driver flip-flop circuits 35 and 36 are substantially identical to the transistor flip-flop circuit 27 except that only one primary winding of a transformer is connected in the collector load instead of two as in the flip-flop circuit 27.

In a preferred form of the invention, the off pulse signal is synchronized with the on pulse signals of the flip-flop circuits 35 and 36. The off pulse signal is fed into terminal 41 which in turn is connected to the leads cross-coupling the driver flip-flop circuits 35 and 36 to each other. A pair of diodes 42 and 43 are interconnected between the source of the off pulse signal and the flip-flop circuits 35 and 36 to prevent the signals of the flip-flop circuits 35 and 36 from interacting with one another and from entering the source of the off pulse signal. The off pulse signal reduces the on pulse signal being fed to the gate of the conducting main silicon controlled rectifier to zero. Simultaneously the off pulse signal is fed to the gate of the third silicon controlled rectifier 20 for shorting the capacitor connected to the anode of the conducting main silicon controlled rectifier and for making the conducting main silicon controlled rectifier nonconductive before the end of the normal conduction cycle.

Figure 4:
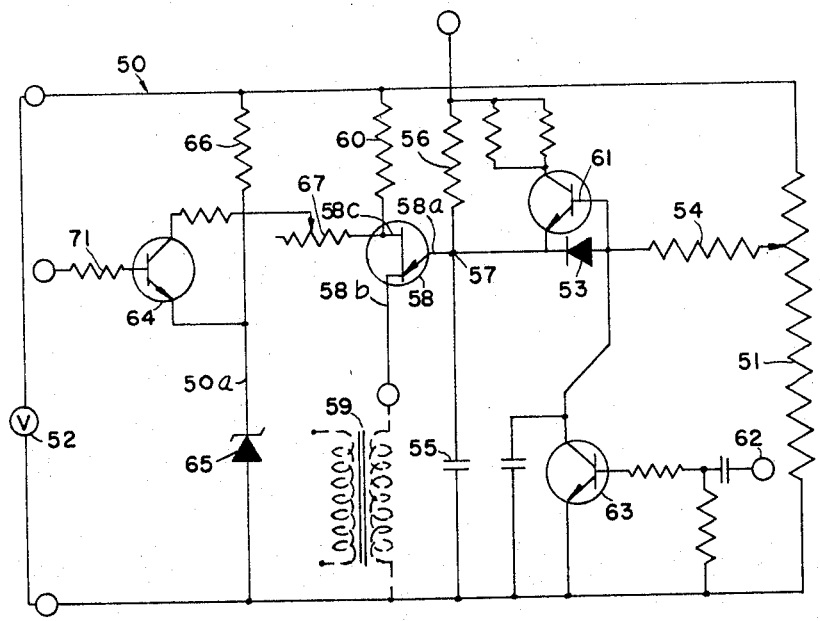
FIGURE 4 is a schematic diagram of an off pulse signal generator synchronized with the control circuit for controlling the firing cycle of the inverter circuit.
Figure 5:
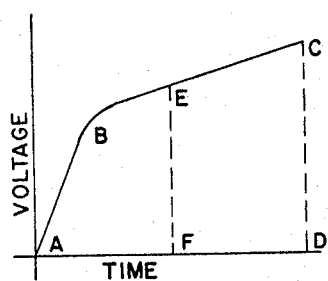
FIGURE 5 is a graph depicting the charging rate of a capacitor employed in the generator of FIGURE 4.

The off pulse signal is obtained from an off pulse signal generator 50 schematically shown in FIGURE 4 of the drawings. A potentiometer 51 is connected across a source of voltage 52 and a diode 53 is connected to a center tap of the potentiometer 51 having a resistor 54 therebetween for charging a capacitor 55. The capacitor 55 in series with a resistor 56 is connected across the source of voltage 52, and the junction 57 between the resistor 56 and the capacitor 55 is connected to the cathode electrode of the diode 53. As soon as a voltage is applied to the potentiometer 51, the diode 53 becomes conductive since the voltage at the cathode is lower than the voltage at the anode and the capacitor charges at a first rate (see FIGURE 5). When the capacitor 55 charges to voltage B, the diode 53 becomes nonconductive. The charging rate of the capacitor 55 is, therefore, decreased since the capacitor 55 can only charge at a lower rate through the resistor 56. The difference in the charging rates of the capacitor 55 is obtained by making resistor 54 much lower than the resistor 56, e.g., resistor 54 is 1,000Ω and resistor 56 is 150,000Ω.

A unijunction transistor 58 is connected in the circuit, the emitter 58a being connected to the junction 57 and one of the bases 58b being connected to one end of a primary winding of a transformer 59, the other end of the primary winding of the transformer 59 being connected to one side of the source of voltage 52. The other of the bases of the unijunction transistor 58 is connected to a current limiting resistor 60. As soon as the voltage across the capacitor 55 reaches point C, in other words, a voltage equal to the peak emitter voltage of the unijunction transistor 58, the transistor 58 fires and feeds a signal, i.e., the off pulse signal, to the primary winding of the transformer 59. The signal obtained from the secondary winding of the transformer 59 is fed into the driver flip-flop circuits 35 and 36 through the terminal 41. The capacitor 55 does not recharge immediately after the unijunction transistor 58 is fired because the diode 53 and the resistor 54 pass sufficient hold-on current for the unijunction transistor 58. Due to changing of the characteristics of the unijunction transistor 58 with temperature, an emitter following transistor 61 is added to increase the unijunction transistor 58 hold-on current. The capacitor 55 can be only be charged after a signal is fed into terminal 62 causing transistor 63 to become conductive and reduce the voltage at the anode electrode of the diode 53 and at the base of the transistor 61 causing the hold-on current of the unijunction transistor 58 to drop off.

By feeding the same control signal from the unijunction oscillator 25 to the flip-flop circuits 27, 35 and 36 as well as to the terminal 62 of the off pulse signal generator for recharging the capacitor 55, the two signals always are synchronized. By altering the phase angle of the off pulse signal fed into the third silicon controlled rectifier 20 with respect to the control signals fed into the main silicon controlled rectifiers 11 and 12, the rate of power delivered by the main rectifiers 11 and 12 can be controlled. Such control can be obtained by altering the supply voltage to the unijunction transistor 58 or by altering the center tap of the potentiometer 51.

A transistor 64 receiving a signal from the load 15 can also be employed in the off pulse signal generator 50 for controlling the supply voltage of the unijunction transistor 58. Preferably a rectifying circuit (see FIGURE 6) sensing the voltage at the load 15 of the inverter circuit 10 is connected to the transistor 64 in order to maintain the voltage of the load constant. The sensing circuit 50a in conjunction with the off pulse signal generator 50 functions as a feedback circuit and any change in the voltage at the load is reflected in the off pulse signal generator 50 causing the transistor 64 to alter the supply voltage to the unijunction transistor 58. A Zener diode 65 connected in series with a resistor 66 is connected across the source of voltage 52, and the emitter electrode of the transistor 64 is connected to the junction between the Zener diode 65 and the resistor 66. The collector electrode of the transistor 64 is connected to a movable tap of a potentiometer 67, one end of the potentiometer being connected to the base 58c of the unijunction transistor 58.

Figure 6:
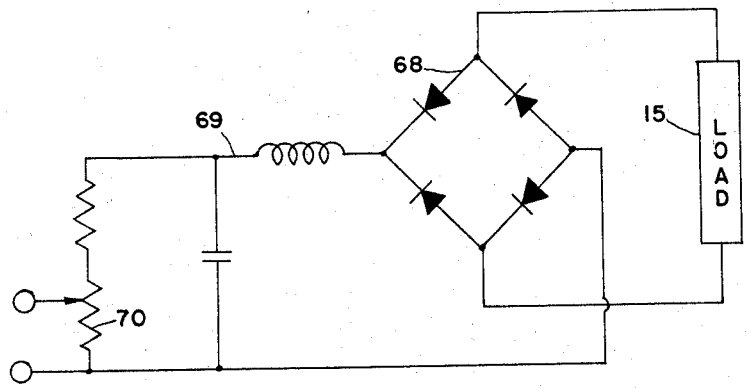
FIGURE 6 is a schematic diagram of a sensing circuit employed with the off pulse signal generator of FIGURE 4.

The output voltage of the load of the inverter circuit 10 is changed to DC by a suitable bridge-type rectifier 68 schematically shown in FIGURE 6 of the drawings. The output of the rectifier 68 is fed through a series parallel filter 69, and a potentiometer 70 connected across the capacitor of the filter 69 is employed for tapping off a feedback voltage to the transistor 64. A suitable resistor 71 is connected in series with the base of the transistor 64 to limit the current. The alternating wave output voltage of the inverter load is, therefore, changed to direct current, applied to the base electrode of the transistor 64, and effectively compared with the standard voltage across the Zener diode 65. If the output voltage of the load 15 is too high, the transistor 64 will conduct and cause the unijunction transistor 58 to fire sooner on the next conducting cycle. For example, at point E as shown in the curve in FIGURE 5 of the drawings. By firing the unijunction transistor earlier, the off pulse signal is fed into the terminal 41 of the flip-flop circuits 35 and 36 for cutting off the control signal at the gate of the main conducting rectifier and into the third silicon controlled rectifier 20 for firing the rectifier 20 to short circuit the main control rectifier that is conducting.

While there has been illustrated and described what is at present considered to be a preferred embodiment of the present invention, it will be appreciated that numerous changes and modifications are likely to occur to those skilled in the art, and it is intended in the appended claims to cover all those changes and modifications which fall within the true spirit and scope of the present invention.

What is claimed as new and desired to be secured by Letters Patent of the United States is:

1. An inverter circuit comprising a pair of silicon controlled rectifiers having anode and cathode electrodes, means connecting together the anode electrodes of the rectifiers, a transformer having a primary winding and a secondary winding the primary winding being connected to the cathode electrodes, the secondary winding being connected to a load, a sine wave filter connected between the secondary winding and the load, a source of direct current, one side of the source of direct current being connected to the means connecting together the anode electrodes, the other side of the source of direct current being connected to a center tap on the primary winding of the transformer, an input filter connected between the source of direct current and the rectifiers, a high frequency inductance connected between the source of direct current and the rectifiers, a pair of capacitors connected between the cathode electrodes, a third silicon controlled rectifier having its anode electrode connected to the above-mentioned means and its cathode electrode connected to the junction between the capacitors, a resistor connecting together the junction to the tap on the primary winding of the transformer, and control means for firing the third silicon controlled rectifier while one of the pair of rectifiers is conducting thereby to provide a low impedance path for the conduction of current from said first mentioned means to the junction between said capacitors.

2. The inverter circuit of claim 1, wherein the high frequency inductance is connected to the means connecting together the anode electrodes, means are provided connecting together the input filter and the high frequency inductance, and a pair of diodes is connected into the circuit, the cathode electrode of each of the diodes being connected to the means connecting together the input filter and the high frequency inductance, the anode electrode of each of the diodes being connected to the primary winding of the transformer.

3. A control circuit for firing a pair of silicon controlled rectifiers comprising a unijunction pulse oscillator, a first transistor flip-flop circuit connected to the oscillator, a pair of transformers each having a primary winding and a secondary winding, the primary winding of each of the transformers being connected in series in the collector load of the transistors of the first flip-flop circuit, a capacitor connected across each of the primary windings, second and third transistor flip-flop circuits, one of the transformers having its secondary winding connected to the second transistor flip-flop circuit, the other of the transformers having its secondary winding connected to the third transistor flip-flop circuit, a pair of output transformers, the primary winding of one of the output transformers being connected in the collector load of the second transistor flip-flop circuit, the primary winding of the other output transformer being connected in the collector load of the third transistor flip-flop circuit, and means connecting together the base electrodes of the transistors of the second and third flip-flop circuits.

4. The control circuit of claim 3 wherein the means connecting the base electrodes of the transistors of the second flip-flop circuit to the base electrodes of the transistors of the third flip-flop circuit comprises a pair of diodes cross-coupled to the transistors in order that the second and third flip-flop circuits are always opposite to each other.

5. The control circuit of claim 4 wherein an off pulse generator is connected to the means connecting the second and third transistor flip-flop circuits together.

6. An off pulse generator comprising a source of direct current, a unijunction transistor having a pair of base electrodes and an emitter electrode, a transformer having a primary winding and a secondary winding, the primary winding of the transformer having one terminal connected to one side of the source of direct current and the other terminal connected to one of the base electrodes of the unijunction transistor, the other of the bases being connected to the other side of the source of direct current, a capacitor and a first resistor connected in series across the source of direct current, one side of the capacitor being connected to the one side of the source of direct current, the emitter electrode of the unijunction transistor being connected to the junction between the first resistor and the capacitor, a first circuit means connected between the junction and the source of direct current for charging the capacitor at a first rate, a second circuit means including the first resistor for charging the capacitor at a second rate until the charge on the capacitor reaches the firing point of the unijunction transistor and discharges the capacitor through the primary winding of the transformer, a third circuit means connected in circuit with the emitter electrode of the unijunction transistor for maintaining the unijunction transistor in a clamped condition, a fourth circuit means connected to the third circuit means for reducing the voltage at the emitter electrode of the unijunction transistor below the clamp level upon the application of a signal thereinto thereby to cut off conduction of the unijunction transistor, and a fifth circuit means for altering the firing point of the unijunction transistor for changing the phase angle of the signal obtainable from the secondary winding of the transformer with respect to the signal applied to the fourth circuit means, the signal obtainable from the secondary winding of the transformer being induced therein by the discharge of the capacitor through the primary winding of the transformer 7. The off pulse generator of claim 6 comprising a second transistor connected to the other of the base electrodes of the unijunction transistor, a Zener diode having its anode electrode connected to the one side of the source of voltage, a second resistor connected between the cathode electrode of the Zener diode and the other side of the source of direct current, the emitter electrode of the second transistor being connected to the junction between the second resistor and the Zener diode, and a potentiometer connected between the other of the bases of the unijunction transistor and the collector of the second transistor for altering the supply voltage of the unijunction transistor.

8. The off pulse generator of claim 6, wherein the first means for charging the capacitor at the first rate comprises a potentiometer connected across the source of direct current, a second resistor connected to the movable tap of the potentiometer, and a diode having its anode electrode connected in series to the second resistor and its cathode electrode connected to the junction between the capacitor and the first resistor, the first resistor having a substantially higher resistance value than the second resistor in series with the diode whereby the capacitor is charged at the first rate when the diode is conducting and at the second rate through the first resistor when the diode becomes nonconductive.

9. The off pulse generator of claim 6, wherein the fourth circuit means for reducing the voltage at the emitter electrode of the unijunction transistor comprises a transistor connected to one side of the source of direct current and to the third circuit means.

10. An inverter circuit comprising a pair of silicon controlled rectifiers having anode and cathode electrodes, means connecting together the anode electrodes of the rectifiers, a transformer having a primary winding and a secondary winding, the primary winding being connected to the cathode electrodes, the secondary winding being connected to a load, a sine wave filter connected between the secondary winding and the load, a source of direct current, an input filter and a high frequency inductance connected between the source of direct current and the silicon controlled rectifiers, one side of the source of direct current being connected to a center tap on the primary winding of the transformer, the high frequency inductance being connected between the means connecting together the anode electrode and the input filter to keep noise out of the source of direct current, a pair of capacitors connected between the cathode electrodes, a third silicon controlled rectifier having its anode electrode connected to the above-mentioned means and its cathode electrode connected to the junction between the capacitors, a resistor connecting together the junction to the tap on the primary winding of the transformer, and control means for firing the third silicon controlled rectifier while one of the pair of rectifiers is conducting thereby to provide a low impedance path between said means and the junction between the capacitors through the third silicon controlled rectifier whereby the conducting one of the pair of silicon controlled rectifiers is essentially short circuited.

11. A control circuit for firing a pair of silicon controlled rectifiers having gate electrodes, the control circuit comprising a unijunction pulse oscillator, a first transistor flip-flop circuit connected to the oscillator, coupling means for connecting the output sides of the first transistor flip-flop circuit together, a second and a third transistor flip-flop circuit, one of the coupling means being connected to the second transistor flip-flop circuit, the other coupling means connected to the third transistor flip-flop circuit, a pair of output transformers each having a primary and secondary winding, the primary windings of the output transformers being connected in the collector loads of the second and third transistor flip-flop circuits, the secondary windings connected to the gate electrodes of the silicon controlled rectifiers, and third means connecting together the base electrodes of the transistors of the second and third flip-flop circuits.

12. An inverter circuit comprising a pair of silicon controlled rectifiers having anode and cathode electrodes, a transformer having a primary winding and a secondary winding, the primary winding being connected to the cathodes of the pair of silicon controlled rectifiers, the secondary winding being connected to a load, means connected between the secondary winding and the load for filtering the output voltage, a source of direct current connected to the anodes of the pair of silicon controlled rectifiers, an input filter connected between the source of direct current and the rectifiers, a high frequency inductance connected between the input filter and the rectifiers, a pair of capacitors joined together at a junction and connected between the pair of silicon controlled rectifiers, a third silicon controlled rectifier interconnected between the source of direct current and the junction between the capacitors, a resistor connecting together the third silicon controlled rectifier to a tap on the primary winding of the transformer and control means for firing the third silicon controlled rectifier while one of the pair of rectifiers is conducting, thereby to provide a low impedance path between the source of direct current and the capacitors.

References Cited
UNITED STATES PATENTS

| | | | |
|---|---|---|---|
| 3,075,136 | 1/1963 | Jones | 321—16 X |
| 3,085,190 | 4/1963 | Kearns et al. | 321—47 XR |
| 3,181,053 | 4/1965 | Amato | 321—45 |
| 3,226,626 | 12/1965 | Moore | 322—16 |
| 3,229,191 | 1/1966 | Williamson | 307—99 X |
| 3,263,153 | 7/1966 | Lawn | 321—45 |
| 3,264,548 | 8/1966 | King | 321—45 |
| 3,305,761 | 2/1967 | Heinrich et al. | 321—45 |
| 3,315,146 | 4/1967 | Paice | 321—18X |

JOHN F. COUCH, *Primary Examiner.*

W. M. SHOOP, *Assistant Examiner.*